United States Patent
Nun et al.

(10) Patent No.: US 8,881,307 B2
(45) Date of Patent: Nov. 4, 2014

(54) ELECTRONIC FILE SECURITY MANAGEMENT PLATFORM

(75) Inventors: Yiftach Nun, Kibutz Dafna (IL); Inbal Zilberman Kubovsky, Ramat Gan (IL)

(73) Assignee: SAP SE, Walldorf (DE)

( * ) Notice: Subject to any disclaimer, the term of this patent is extended or adjusted under 35 U.S.C. 154(b) by 171 days.

(21) Appl. No.: 13/483,429

(22) Filed: May 30, 2012

(65) Prior Publication Data

US 2013/0326640 A1    Dec. 5, 2013

(51) Int. Cl.
*G06F 21/00* (2013.01)
*G06F 21/60* (2013.01)
*H04L 29/06* (2006.01)

(52) U.S. Cl.
CPC ............ *G06F 21/604* (2013.01); *H04L 63/104* (2013.01); *H04L 63/105* (2013.01)
USPC .................... 726/30; 726/26; 726/27; 726/28; 726/29; 713/189; 713/190; 713/191; 713/192; 713/193

(58) Field of Classification Search
CPC .............. G06F 21/604; H04L 63/104–63/105
USPC .......................................................... 726/30
See application file for complete search history.

(56) References Cited

U.S. PATENT DOCUMENTS

| 6,253,193 | B1 * | 6/2001 | Ginter et al. ..................... 705/57 |
| 7,874,013 | B2 * | 1/2011 | Kaminaga et al. .............. 726/28 |
| 2006/0075228 | A1 * | 4/2006 | Black et al. .................... 713/167 |

* cited by examiner

*Primary Examiner* — Longbit Chai
(74) *Attorney, Agent, or Firm* — Buckley, Maschoff & Talwalkar LLC

(57) ABSTRACT

According to some embodiments, an electronic file security management platform may receive a request from a user to access a first electronic file associated with a first application, such as a word processing document. A security characteristic associated with the user may be determined, and an encrypted version of the first electronic file may be decrypted in accordance with the security characteristic. The electronic file security management platform may then arrange for the user to access the first electronic file via the first application such that: (i) a first portion of the first electronic file is available to the user based on a first security requirement associated with the first portion and the security characteristic, and (ii) a second portion of the first electronic file is not available to the user based on a second security requirement associated with the second portion and the security characteristic.

26 Claims, 10 Drawing Sheets

ELECTRONIC FILE SECURITY MANAGEMENT PLATFORM

FIELD

Some embodiments relate to systems and methods associated with electronic files. More specifically, some embodiments are directed to systems and methods to provide an electronic file security management platform.

BACKGROUND

An enterprise typically stores large amounts of information in electronic files. For example, a company might store word processing documents, financial spreadsheets, and business presentations in a repository that may be accessed by employees. Note, however, that in some situations the enterprise might want to limit access to these electronic files. For example, not all employees should be allowed to view a document that lists every employee's home address and yearly salary. To limit access to this type of information, a security requirement may be associated with some or all of the electronic files. For example, FIG. 1 illustrates an example 100 including a first electronic file 110 and a second electronic file 120. The first electronic file 110 is associated with a first security requirement (e.g., a first password) while the second electronic file 120 is associated with a second security requirement (e.g., a second password). Thus, employees in a human resources department might be given the second password and, as a result, only those employees might be able to access the second electronic file 120.

In many cases, an electronic file may be associated with multiple portions. For example, the electronic files 110, 120 in FIG. 1 each contain a first portion and a second portion. Moreover, an enterprise might be interested in limiting access to certain portions while still allowing access to other portions (e.g., a school might want to let students access one portion of an electronic file that lists homework assignments while preventing access to another portion that lists the test scores of all students). Providing a security requirement associated with an entire electronic file, however, does not provide such a capability.

Accordingly, methods and mechanisms to efficiently, accurately, and/or automatically limit access to portions of electronic files may be provided in accordance with some embodiments described herein.

DETAILED DESCRIPTION

Figure 1:
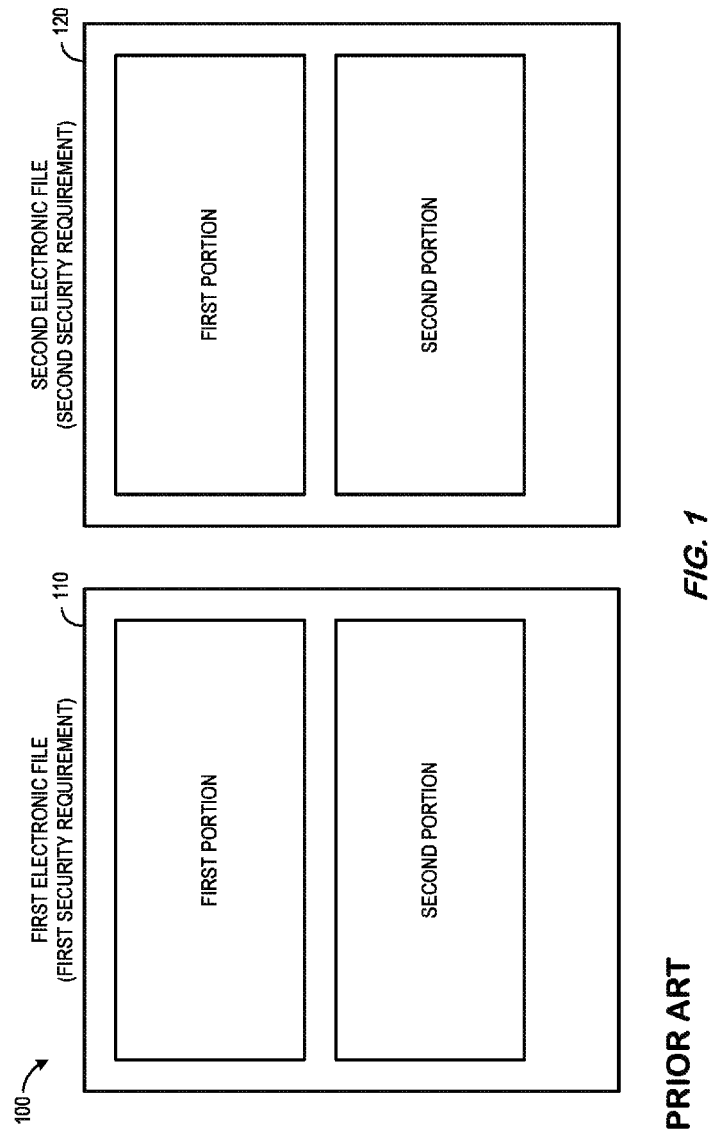
FIG. 1 illustrates an example including two electronic files.
Figure 2:
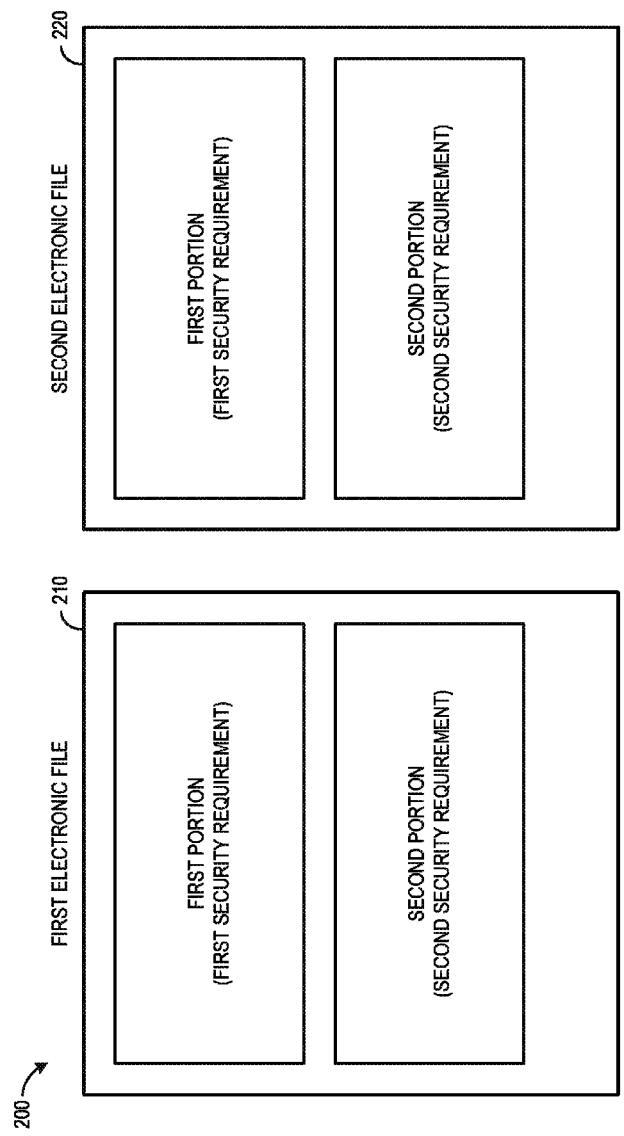
FIG. 2 illustrates an example including two electronic files according to some embodiments.

An enterprise may stores information in electronic files, such as word processing documents, financial spreadsheets, and business presentations in a repository that may be accessed by employees. Moreover, each electronic file might include a number of different portions. For example, FIG. 2 illustrates an example 200 including a first electronic file 210 and a second electronic file 220, each including a first portion and a second portion.

In many cases, an enterprise might be interested in limiting access to certain portions while still allowing access to other portions (e.g., a business might want to let employees access one portion of an electronic file that lists broad business goals while preventing access to another portion that lists specific companies that the businesses is thinking of purchasing to meet those goals). Accordingly, methods and mechanisms to efficiently, accurately, and/or automatically limit access to portions of electronic files may be provided in accordance with some embodiments described herein. In particular, as illustrated in FIG. 2, a first portion of the first electronic file 210 is associated with a first security requirement while a second portion of the first electronic file 210 is associated with a second security electronic file. Similarly, a first portion of the second electronic file 220 is associated with a first security requirement while a second portion of the second electronic file 220 is associated with a second security electronic file. Thus, if an employee is given a password representing the first security requirement, he or she would be able to access the first portion of both files 210, 220 without being able to access the second portions.

Figure 3:
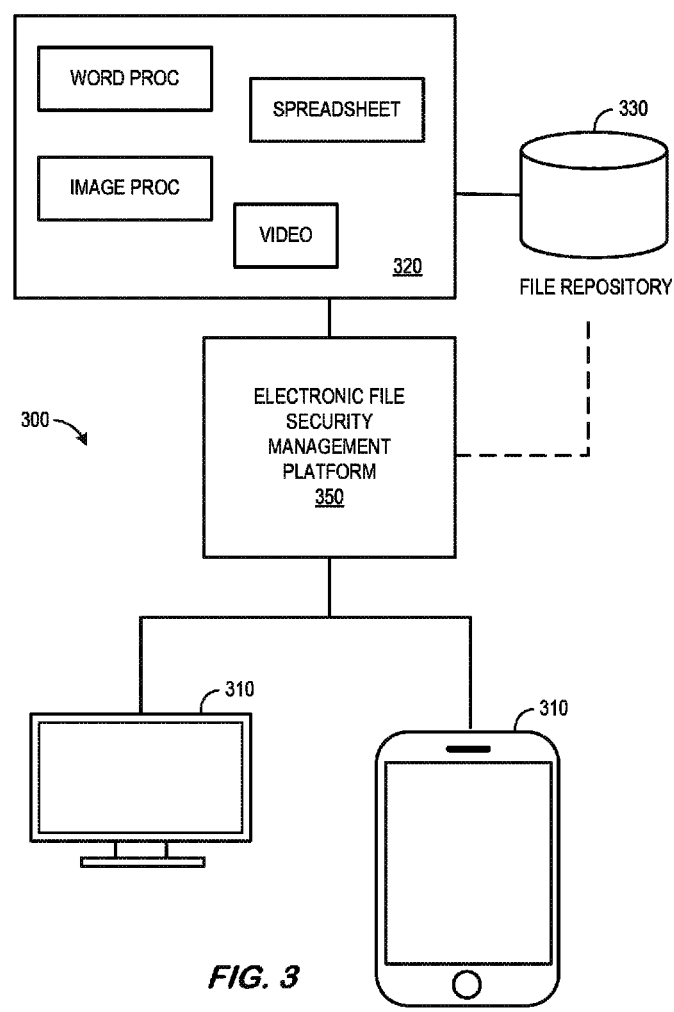
FIG. 3 is a block diagram of a system associated with electronic files in accordance with some embodiments.

FIG. 3 is a block diagram of such a system 300 according to some embodiments. The system 300 includes an electronic file security management platform 350 coupled to one or more databases or data stores containing a file repository 330. By way of example only, the electronic file security management platform 350 might be associated with an Enterprise Resource Planning (ERP) server, a business services gateway, a HyperText Transfer Protocol (HTTP) server, and/or an Advanced Business Application Programming (ABAP) server. According to some embodiments, the electronic file security management platform 350 may also be connected to various user management systems. For example, an SAP® HANA user management system, MICROSOFT® WINDOWS user management system, etc. might provide permissions of the portions from a user in such systems.

According to some embodiments, the electronic file security management platform 350 may directly communicate with one or more remote user devices 310 via the Internet. According to other embodiments, a gateway may be provided between the electronic file security management platform 350 and the user devices 310. The user devices 310 may include one or more processors to receive electronic files and/or to execute applications and/or components (e.g., a plug-in that is integrated to a smartphone).

Note that FIG. 3 represents a logical architecture for the system 300 according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 3, including the electronic file security management platform 350 and user devices 310 may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

All systems and processes discussed herein may be embodied in program code stored on one or more computer-readable media. Such media may include, for example, a floppy disk, a CD-ROM, a DVD-ROM, magnetic tape, OR solid state Random Access Memory (RAM) or Read Only Memory (ROM) storage units. Embodiments are therefore not limited to any specific combination of hardware and software.

Figure 4:
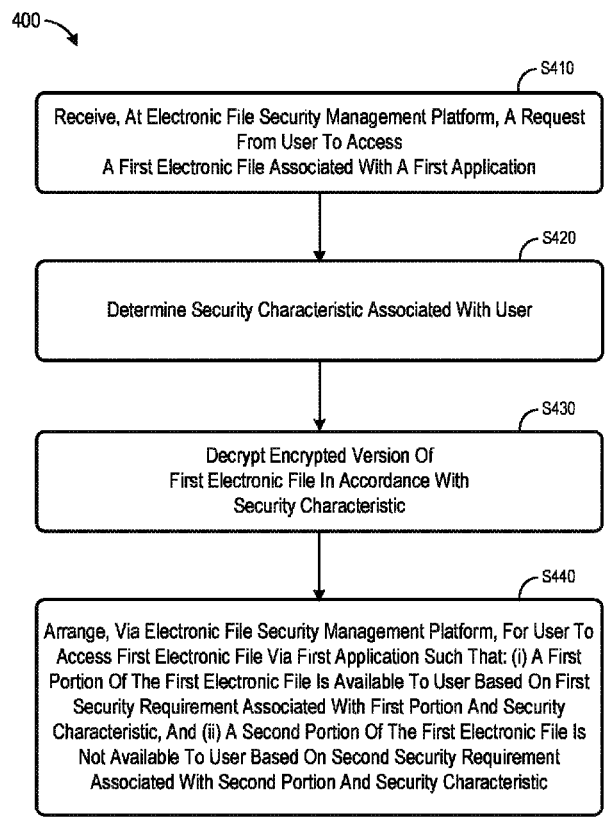
FIG. 4 is a flow diagram of a process in accordance with some embodiments.

FIG. 4 is a flow diagram of a process 400 that might be associated with the electronic file security management platform 350 and/or user devices 310 of FIG. 3 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S410, a request from a user to access a first "electronic file" associated with a first application may be received at an electronic file security management platform. As used herein, the phrase "electronic file" might refer to, for example, a word processing document, a spreadsheet file, an image file, an audio file, a video file, an electronic mail file, streaming information a text file, an XML file, a source code file, and/or any combination of these types of information. By way of example, an employee might indicate to the electronic file security management platform that he or she wishes to open a word processing document associated with a legal contract.

At S420, a "security characteristic" associated with the user may be determined. As used herein, the phrase "security characteristic" might refer to, for example, a user identifier, a user credential (e.g., a password or security certificate), a user role within an organization, a user age, social network information, a user gender, a user's residential area, a rank within an organization, a user device, user preferences, past behavioral patterns, and/or any combination of these types of information. For example, it might be determined that a user requesting access to word processing document associated with a legal contract is an engineer but not an attorney.

At S430, an encrypted version of the first electronic file may be decrypted in accordance with the security characteristic. For example, a password, security certificate, a PGP key, and/or any other type of information might be used to decrypt the electronic file.

At S440, it may be arranged, via the electronic file security management platform, for the user to access the first electronic file via the first application. In particular, a first portion of the first electronic file may be available to the user based on a first security requirement associated with the first portion and the security characteristic. Note, however, that a second portion of the first electronic file may not be available to the user based on a second security requirement associated with the second portion and the security characteristic. For example, an engineer might be allowed to view and modify certain portions of a legal contract (e.g., associated with target due dates) while not being allowed to view and/or modify other portions (e.g., associated with legal definitions or disclaimers). As used herein, a user's access to a portion of an electronic file might be associated with, for example, viewing the portion, deleting the portion, changing the portion, creating a new portion, and/or altering a security requirement associated with a portion (e.g., changing who is allowed to view that portion).

Figure 5:
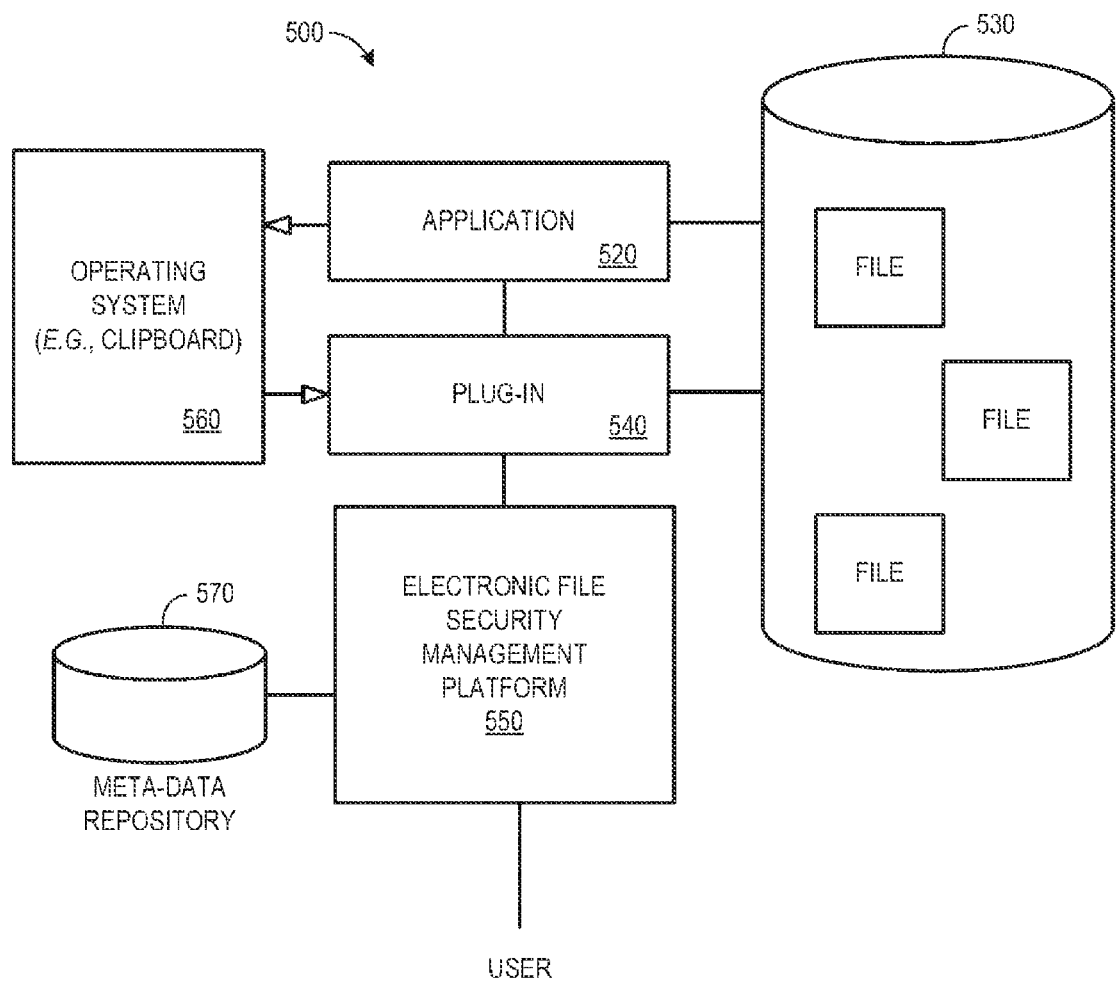
FIG. 5 is a block diagram of a system associated with electronic files in accordance with some embodiments.

FIG. 5 is a block diagram of a system 500 associated with electronic files in accordance with some embodiments. As with FIG. 3, users may communicate with an electronic file security management platform 550 via user devices (e.g., PCs, laptop computers, smartphones, etc.) to create or access electronic files stored in a file repository 530 via an application 520. For example, a user might want to access a word processing document stored in the file repository 530 via a word processing application. According to some embodiments, the electronic file security management platform 550 interfaces with the application 520 via one or more Application Programming Interfaces (APIs) and plug-in components 540. Note that both the application 520 and plug-in 540 may exchange information with an operating system 560, such as a clipboard component of the operating system 560.

In some cases, a creator of an electronic file may define a security requirement for a document portion. For example, the author of a document might highlight a particular portion and indicate to the electronic file security management platform 550 that only managers should be allowed to change that portion. According to some embodiments, an electronic file security management platform 550 might automatically assign a security requirement to a portion based on content detected in that portion. For example, the electronic file security management platform 550 might detect that employee salary information was "cut and pasted" into a table and, as a result, automatically limit viewing of that table to employees who work in the company's human resources department. Note that according to some embodiments, such information may be obtained from metadata (either configured by a user, provided with the platform 550, received from an online source, or accumulated by monitoring work that provides characteristics of a portion). According to some embodiments, a metadata repository 570 (located locally, via a server, or via the web) may build up and maintain such information indentifying electronic information and its required security level and/or correct characterization.

According to some embodiments, an automatic notification may be generated when content is detected that conflicts with security requirements (e.g., in accordance with a rule stored in the metadata repository 570). Moreover, a final version of an electronic file may be automatically verified and security requirements may be associated to portions of the final version in accordance with information in the metadata repository 570.

According to other embodiments, an electronic file security management platform might automatically assign a security requirement to a portion based on a creator of the portion. For example, changes to a paragraph written by someone in a legal department might only be allowed to be changed by other employees in the legal department. Note that any change to an electronic file might result in the file being re-encrypted to create a re-encrypted version that will replace the prior encrypted version of the electronic file.

Thus, different portions of a single electronic file within the repository 530 may be edited and/or viewed as appropriate in accordance with a context of a specific user (or the role of that user within an enterprise). According to some embodiments, a user accesses the electronic file security management platform 550 to edit a file in the repository 530. According to some embodiments, access via the application 520 is based on logging credentials to enable protection of the file and only allowing the editor to open the file. Note that further editing of the file might not be owned only by the file creator but may instead be performed by others (e.g., in accordance with their roles and specific user identities). According to some embodiments, the user selects the type of file to edit according to the available supported applications 520 (e.g., having appropriate plug-ins 540 for each application 520). Note that plug-in 540 allows for the running of the application 520 from the user context and directs it to save files on a specific directory or to follow a file path in which the current file is being edited. Such an approach doesn't need to be limited to a particular file system and can be in the same way in any repository.

The user may now edit the file and at any point might specify that a specific portion should only be accessed by a specific user or a specific role. During editing, the user may also start a new portion that is characterized with specific metadata and/or attributes qualifying the section to be limited to a specific authorized user or specific roles. According to some embodiments, a final version of a document may be reviewed and, according to specific metadata characterizing information, different portions may be assigned the correct security, authentication, and/or role adaptation according to the attributes and the metadata characterizing the information (e.g., payroll information might be characterized as something that only managers are allowed to see as personal and protected information). The final version of a file might be associated with the highest security level that was set within the file.

The plug-in 540 might use direct access to the application 520 based on an enhancement provided by the application or any open API provided by the application 520 (such as via macros or XML). The plug-in 540 may also use the platform of the operation system 560 to allow access to application 520 using current capabilities or enhanced capabilities made specifically to support the electronic file security management platform 550. Note that the platform 550 might also determine information about the current user from other applications, such as an SAP® HANA system. For example, consider a record with a field from type binary which is a word document. In this case, the system 500 may enable portion 1 in the document to be seen by user having a role of "viewer" in an SAP® HANA system. According to some embodiments, the binary content may be already encrypted and plug-in 540 may be used to view the encrypted content.

According to some embodiments, when the user is done editing the file via the application 520, the file is then encrypted and saved in such way that only the electronic file security management platform 550 can open it with the specific (corresponding) plug-in 540. For specific applications 520 that allow proper APIs and collaboration for the proper plug-in 540, the file might be provided directly under electronic file security management platform 550 context. For example, there are many applications 540 that allow exporting files via "print" capabilities. In the same way, a "save" or "save as" feature may be altered by a corresponding plug-in 540 to be saved under electronic file security management platform 550 context.

A user who wants to read/view a file edited via the electronic file security management platform 550 might need to use the electronic file security management platform 550 to view that file. The user may first, for example, login with his or her credentials and be identified by an appropriate user identification and/or role. If a user does not have the application 520 installed, the plug-in 540 might still provide a view of the file. Note that the exposed parts of the file provided to the user might represent only those portions that were specified for the specific user or for the user's corresponding role and authorization were defined either directly by an author or editor of the file or according to metadata characterizing the content. If a specific user wants to re-edit a file, he or she might only be allowed to do so only in those portions that are available to him or her for editing. After re-editing, the file may then be encrypted again and saved.

To specify edited portions of a file, such as a document, for access by a specific user or role, the plugin 540 may operate to allow instant access to available options (e.g., by pressing a "hot key" and right clicking on a selected paragraph). According to some embodiments, a user may configure in advance a set of users and their roles such as by forming groups based on a user management environment in an organization, based on friends from social networks, or based on any known way of user and role management that allows integration to the system 500 (e.g., associated with a user management engine) and/or a simple extraction and import of information via the plug-in 540.

A user or organization might configure a set of rules, attributes and/or metadata for different types of content and/or define, categorize, and/or characterize types of information to be available section during file editing. According to some embodiments, a pre-determined or default set of rules may be provided. Some or all of this information might be stored, for example, in the metadata repository 570.

During editing, a user may click a hot key to open an electronic file security management platform 550 menu and indicate a current start point to be viewable only by a specific user (or specific role) and an associated end of the portion. In the same way, a user might define a characteristic of current content and provide corresponding metadata for it according to his or her own roles and authorizations. According to some embodiments, there may be an automatic process that reviews a file and, configured rules, attributes and pre-defined definitions may let the electronic file security management platform 550 designate sections as appropriate (e.g., all pages watermarked as "Top Secret" might be designed as only being viewable by employees having such a security clearance).

Figure 6:
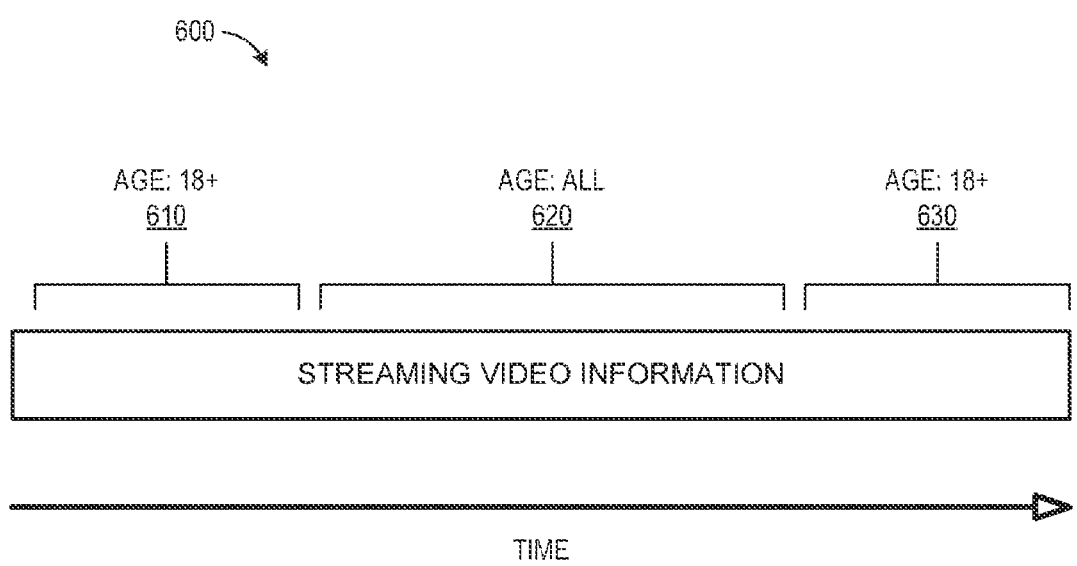
FIG. 6 illustrates streaming information in accordance with some embodiments.

In addition to documents and spreadsheets, some embodiments may be associated with streaming files. For example, FIG. 6 illustrates streaming information 610 in accordance with some embodiments. In particular, a video stream file may contain content rated to specific age. This may be used to censor inappropriate content on the fly according to specific classifications of the content. According to some embodiment, such security requirements may be stored as metadata in an encrypted version of an electronic file. For example, first and third portions 610, 630 of the streaming information 600 might only be viewable by those who are at least eighteen years old (and younger users might only be presented with a blank screen during those portions 610, 630 or the information might simply be skipped) while a second portion 620 might be viewable by everyone.

Figure 7:
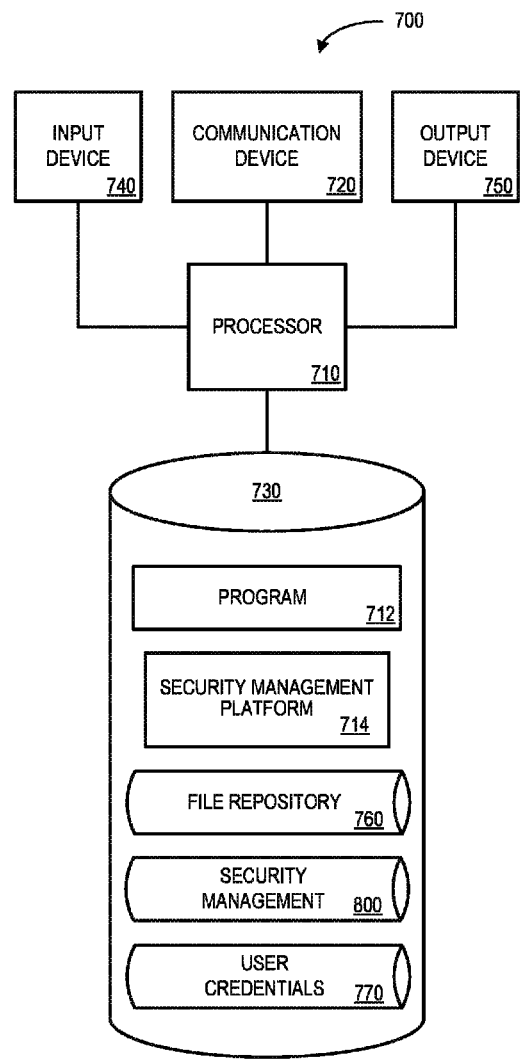
FIG. 7 is a block diagram of an apparatus according to some embodiments.

Note that the architectures described with respect to FIGS. 3 and 5 are provided only as an example, and any other type of apparatus might be provided instead. For example FIG. 7 is a block diagram overview of one such apparatus 700 according to some embodiments. The apparatus 700 may be, for example, associated with an employee device and/or a business server. The apparatus 700 comprises a processor 710, such as one or more commercially available Central Processing Units (CPUs) in the form of one-chip microprocessors, coupled to a communication device 720 configured to communicate via a communication network (not shown in FIG. 7). The communication device 720 may be used, for example, as an input path to receive employee inputs and/or business system data. The apparatus 700 further includes an input device 740 (e.g., a mouse and/or keyboard to enter security requirements) and an output device 750 (e.g., a computer monitor to display business information reports that a user is authorized to view).

The processor 710 communicates with a storage device 730. The storage device 730 may comprise any appropriate information storage device, including combinations of magnetic storage devices (e.g., a hard disk drive), optical storage devices, and/or semiconductor memory devices. The storage device 730 stores a program 712 and/or business data platform 714 for controlling the processor 710. The processor 710 performs instructions of the programs 712, 714, and thereby operates in accordance with any of the embodiments described herein. For example, the processor 710 may receive a request from a user to access a first electronic file associated with a first application, such as a word processing document. A security characteristic associated with the user may be determined by processor 710, and an encrypted version of the first electronic file may be decrypted in accordance with the security characteristic. The processor 710 may then arrange for the user to access the first electronic file via the first application such that: (i) a first portion of the first electronic file is available to the user based on a first security requirement associated with the first portion and the security characteristic, and (ii) a second portion of the first electronic file is not available to the user based on a second security requirement associated with the second portion and the security characteristic.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the apparatus 700 from another device; or (ii) a software application or module within the apparatus 700 from another software application, module, or any other source.

In some embodiments (such as shown in FIG. 7), the storage device 730 stores a file repository database 760, a security management database 800, and/or a user credentials database 770 (e.g., including employee user names and passwords). An example of a security management database 800 that may be used in connection with the apparatus 700 will now be described in detail with respect to FIG. 8. Note that the database described herein is only an example, and additional and/or different information may be stored therein. Moreover, various databases might be split or combined in accordance with any of the embodiments described herein.

Figure 8:
FIG. 8 illustrates a portion of a tabular security management database that might be stored in accordance with some embodiments.
Figure 9:
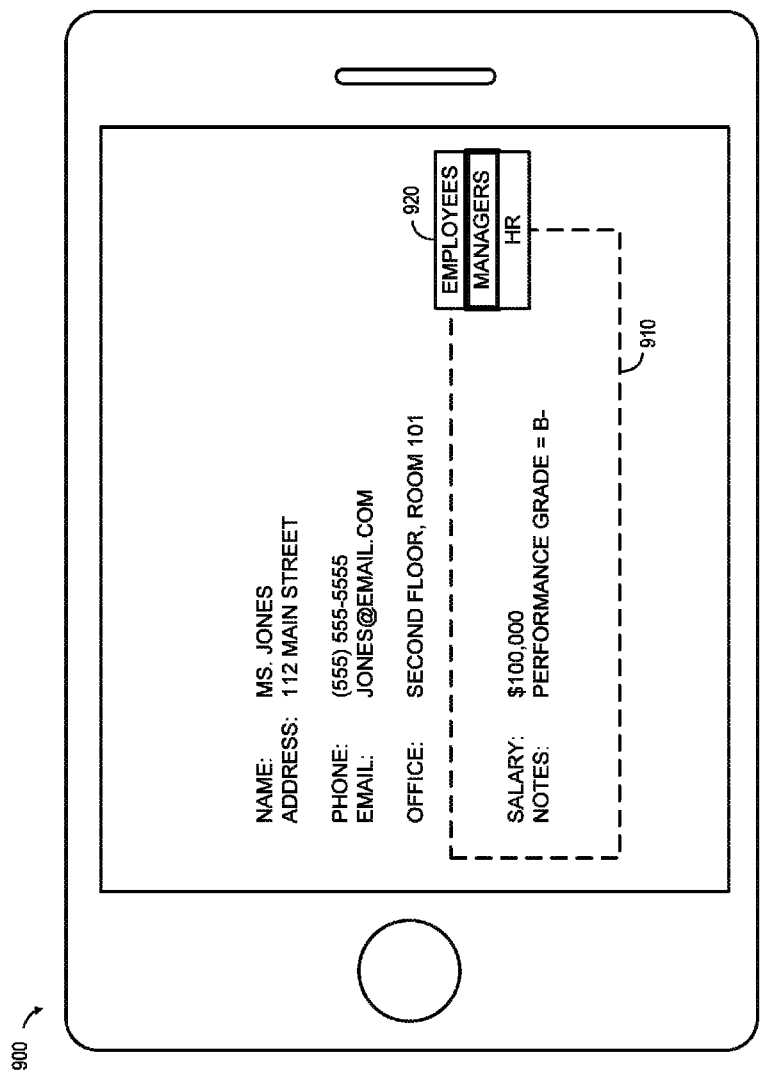
FIG. 9 illustrates a graphical user interface display that might be provided to a file creator in accordance with some embodiments.
Figure 10:
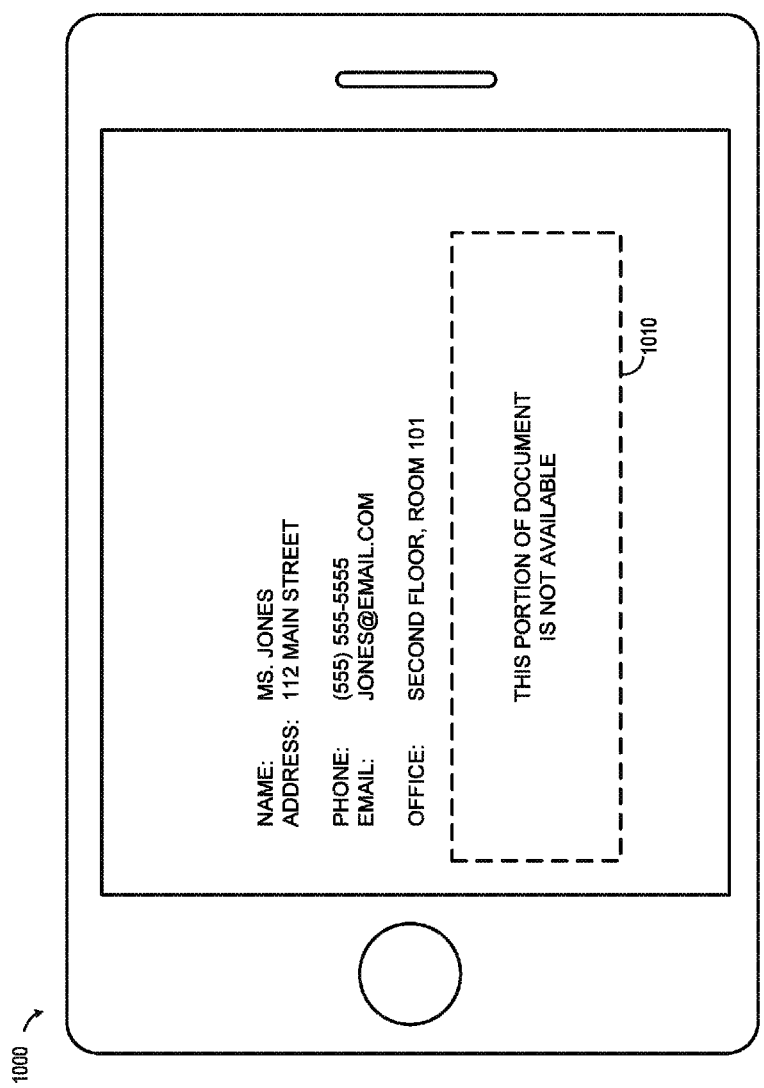
FIG. 10 illustrates a display that might be provided to a file viewer in accordance with some embodiments.

Referring to FIG. 8, a table is shown that represents the security management database 800 that may be stored at the apparatus 700 according to some embodiments. The table may include, for example, entries identifying portions of electronic files associated with an enterprise. The table may also define fields 802, 804, 806, 808, 810 for each of the entries. The fields 802, 804, 806, 808, 810 may, according to some embodiments, specify: a file identifier 802, a portion identifier 804, a security requirement 806, a user's security characteristics 808, and an access indication 810. The information in the security management database 800 may be created and updated, for example, based on data received from file creators, editors, and/or the user.

The file identifier 802 may be, for example, a unique alphanumeric code identifying an electronic file and the portion identifier 804 identifies a sub-set of the information in the file. For example, as illustrated by the first two entries in FIG. 8, the file identifier F_101 is associated with two portions: P_101 and P_102. The security requirement 806 might indicate a condition, rule, or logic that defines who can access a particular portion. For example, portion P_102 of file F_101 can be accessed by any user who is an employee of enterprise while portion P_101 of that file can only be accessed by user's who work in the human resources department. Note that portion P_101 of file F_102 may be independent of P_101 of file F_101 (and have different security requirements 806). The user's security characteristics 808 define information about the user (e.g., the user's role within the enterprise and age) and the access indication 810 might indicate whether or not the user is allowed to access that particular portion of the file.

Note that the security management database 800 may further support interaction with a user management system. For example, a shared document accessed via an SAP® HANA application might have portions accessible in accordance with HANA user management. When the same document is accessed via a portal other portions might be available. Note that a management platform may be used by other applications to retrieve the encrypted electronic file. As a result, user credentials and authorizations in the system (e.g., either HANA, Portal, Sharepoint, etc.) can be transferred and used by the management platform to provide appropriate content to a user.

Thus, some embodiments may establish methods and mechanisms to efficiently, accurately, and/or automatically limit access to portions of electronic files. Moreover, embodiments may let users view and/or edit files in accordance with their particular roles within an organization.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to business systems, note that embodiments may be associated with other types of enterprise data. For example, financial, governmental, and/or medical information may be processed in accordance with any of the embodiments described herein.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method of facilitating access to electronic files via a plurality of applications, comprising:
receiving, at an electronic file security management platform, a request from a user to access a first electronic file associated with a first application the electronic file comprising a first portion and a second portion;
automatically determining, via a processor device, a first security requirement associated with the first portion, the determining of the first security requirement comprising:
automatically detecting additional data of a particular type that has been added to the first portion of the electronic file,
automatically determining, in response to the detection, a category of users that can view the added data, and
automatically limiting access of the first portion of the electronic file to the category of users based upon the added content detected in the first portion, the first security requirement stored in an encrypted version of the first electronic file;
determining a security characteristic associated with the user;
decrypting the encrypted version of the first electronic file in accordance with the security characteristic and the security requirement associated with the first portion; and
arranging, via the electronic file security management platform, for the user to access the first electronic file via the first application such that: (i) the first portion of the first electronic file is available to the user based on the first security requirement associated with the first portion and the security characteristic, and (ii) the second portion of the first electronic file is not available to the user based on a second security requirement associated with the second portion and the security characteristic.

2. The method of claim 1, wherein the electronic file is associated with at least one of: (i) a word processing document, (ii) a spreadsheet file, (iii) an image file, (iv) an audio file, (v) a video file, (vi) an electronic mail file, (vii) streaming information, (viii) a text file, (ix) an XML file, or (x) a source code file.

3. The method of claim 1, wherein the security characteristic is associated with at least one of: (i) a user identifier, (ii) a user credential, (iii) a user role within an organization, (iv) a user age, (v) social network information, (vi) a user device, (vii) user preferences, or (viii) past behavioral patterns.

4. The method of claim 1, wherein said arranging is performed via a plug-in component of the first application.

5. The method of claim 1, the user's access to the first portion of the first electronic file is associated with at least one of: (i) viewing the first portion, (ii) deleting the first portion, (iii) changing the first portion, (iv) altering the first security requirement, or (v) creating a new portion.

6. The method of claim 1, wherein automatically detecting a type of data added to the first portion comprises monitoring characteristics of the first portion and wherein the electronic file security management platform automatically assigns the first security requirement to the first portion based on content detected in the first portion.

7. The method of claim 6, further comprising:
storing automatically assigned security requirements in a metadata repository.

8. The method of claim 7, further comprising:
generating an automatic notification when content is detected that conflicts with the first security requirement.

9. The method of claim 7, further comprising:
automatically verifying a final version of an electronic file and assigning security requirements to portions of the final version in accordance with information in the metadata repository.

10. The method of claim 1, wherein the electronic file security management platform automatically assigns the first security requirement to the first portion based on a creator of the first portion.

11. The method of claim 1, wherein the first and second security requirements are stored as metadata in the encrypted version of the first electronic file.

12. The method of claim 1, further comprising:
allowing the user to change the first portion of the first electronic file;
re-encrypting the first electronic file to create a re-encrypted version of the first electronic file; and
replacing the encrypted version of the first electronic file with the re-encrypted version.

13. The method of claim 1, further comprising:
receiving, at the electronic file security management platform, a request from a different user to access the first electronic file;
determining a different security characteristic associated with the different user;
decrypting the encrypted version of the first electronic file in accordance with the different security characteristic; and
arranging, via the electronic file security management platform, for the different user to access the first electronic file via the first application such that both the first and second portions of the first electronic file are available to the user based on the first and second security requirements and the different security characteristic.

14. A non-transitory, computer-readable medium storing program code executable by a computer processor to perform a method facilitating access to electronic files via a plurality of applications, the method comprising:
receiving, at an electronic file security management platform, a request from a user to access a first electronic file associated with a first application, the electronic file comprising a first portion and a second portion;
automatically determining, via a processor device, a first security requirement associated with the first portion, the first security requirement stored as in an encrypted version of the first electronic file, the determining of the first security requirement comprising:
automatically detecting additional data of a particular type that has been added to the first portion of the electronic file,
automatically determining, in response to the detection, a category of users that can view the added data, and
automatically limiting access of the first portion of the electronic file to the category of users based upon the added content detected in the first portion;
determining a security characteristic associated with the user;
decrypting the encrypted version of the first electronic file in accordance with the security characteristic and the security requirement associated with the first portion; and
arranging, via the electronic file security management platform, for the user to access the first electronic file via the first application such that: (i) the first portion of the first electronic file is available to the user based on the first security requirement associated with the first portion and the security characteristic, and (ii) the second portion of the first electronic file is not available to the user based on a second security requirement associated with the second portion and the security characteristic.

15. The medium of claim 14, wherein the electronic file is associated with at least one of: (i) a word processing document, (ii) a spreadsheet file, (iii) an image file, (iv) an audio file, (v) a video file, (vi) an electronic mail file, (vii) streaming information, (viii) a text file, (ix) an XML file, or (x) a source code file.

16. The medium of claim 14, wherein the security characteristic is associated with at least one of: (i) a user identifier, (ii) a user credential, (iii) a user role within an organization, (iv) a user age, (v) social network information, (vi) a user device, (vii) user preferences, or (viii) past behavioral patterns.

17. The medium of claim 14, wherein said arranging is performed via a plug-in component of the first application.

18. The medium of claim 14, the user's access to the first portion of the first electronic file is associated with at least one of: (i) viewing the first portion, (ii) deleting the first portion, (iii) changing the first portion, (iv) altering the first security requirement, or (v) creating a new portion.

19. The medium of claim 14, wherein automatically detecting a type of data added to the first portion comprises monitoring characteristics of the first portion and wherein the electronic file security management platform automatically assigns the first security requirement to the first portion based on content detected in the first portion.

20. The medium of claim 14, wherein the electronic file security management platform automatically assigns the first security requirement to the first portion based on a creator of the first portion.

21. The medium of claim 14, wherein the first and second security requirements are stored as metadata in the encrypted version of the first electronic file.

22. A system, comprising:
a file repository storing a plurality of electronic files, including an encrypted version of a first electronic file associated with a first application, wherein the encrypted version of the first electronic file contains metadata indicating a first security requirement associated with a first portion of the first electronic file and a second security requirement associated with a second portion of the first electronic file, the first security requirement determined by automatically detecting additional data of a particular type that has been added to the first portion of the electronic file, automatically determining, in response to the detection, a category of users that can view the added data, and automatically limiting access of the first portion of the electronic file to the category of users based upon the added content detected in the first portion; and
an electronic file security management platform, comprising a processor, to (i) receive a request from a user to access a first electronic file associated with a first application, (ii) determine, via the processor, a security characteristic associated with the user, (iii) decrypting the encrypted version of the first electronic file in accordance with the security characteristic, and (iv) arrange for the user to access the first electronic file via the first application such that:
a first portion of the first electronic file is available to the user based on the first security requirement and the security characteristic, and
a second portion of the first electronic file is not available to the user based on the second security requirement associated with the second portion and the security characteristic.

23. The system of claim 22, wherein the electronic file is associated with at least one of: (i) a word processing document, (ii) a spreadsheet file, (iii) an image file, (iv) an audio file, (v) a video file, (vi) an electronic mail file, (vii) streaming information, (viii) a text file, (ix) an XML file, or (x) a source code file.

24. The system of claim 22, wherein the security characteristic is associated with at least one of: (i) a user identifier, (ii) a user credential, (iii) a user role within an organization, (iv) a user age, (v) social network information, (vi) a user device, (vii) user preferences, or (viii) past behavioral patterns.

25. The system of claim 22, wherein said arranging is performed via a plug-in component of the first application.

26. The system of claim 22, the user's access to the first portion of the first electronic file is associated with at least one of: (i) viewing the first portion, (ii) deleting the first portion, (iii) changing the first portion, (iv) altering the first security requirement, or (v) creating a new portion.

* * * * *